United States Patent
Amendolagine et al.

(10) Patent No.: US 11,222,489 B2
(45) Date of Patent: Jan. 11, 2022

(54) SYSTEM FOR THE IDENTIFICATION AND RECOGNITION OF A MOTOR VEHICLE BASED ON THE PROFILE OF VOLTAGE VALUES FROM THE ONBOARD ELECTRICAL SYSTEM AND CORRESPONDING IDENTIFICATION METHOD IMPLEMENTED BY SAID SYSTEM

(71) Applicant: OCTO TELEMATICS S.p.A., Rome (IT)

(72) Inventors: Marco Amendolagine, Rome (IT); Giuseppe Zuco, Rome (IT)

(73) Assignee: OCTO TELEMATICS S.p.A., Rome (IT)

( * ) Notice: Subject to any disclaimer, the term of this patent is extended or adjusted under 35 U.S.C. 154(b) by 51 days.

(21) Appl. No.: 16/312,702

(22) PCT Filed: Jun. 30, 2017

(86) PCT No.: PCT/IB2017/053949
§ 371 (c)(1),
(2) Date: Dec. 21, 2018

(87) PCT Pub. No.: WO2018/002890
PCT Pub. Date: Jan. 4, 2018

(65) Prior Publication Data
US 2019/0259225 A1    Aug. 22, 2019

(30) Foreign Application Priority Data

Jun. 30, 2016  (IT) .................. 102016000067813

(51) Int. Cl.
*G07C 5/08*    (2006.01)
*G06F 16/21*   (2019.01)
*B60R 25/30*   (2013.01)

(52) U.S. Cl.
CPC ............ *G07C 5/085* (2013.01); *G06F 16/211* (2019.01); *B60R 25/307* (2013.01)

(58) Field of Classification Search
CPC ...... G07C 5/085; B60R 25/307; G06F 16/211
See application file for complete search history.

(56) References Cited

U.S. PATENT DOCUMENTS

| 9,511,677 B1* | 12/2016 | Brooks | .................. B60L 53/63 |
| 2011/0302078 A1* | 12/2011 | Failing | ..................... H02J 5/00 705/39 |
| 2013/0328525 A1* | 12/2013 | Erger | ................... H02J 7/0027 320/109 |

FOREIGN PATENT DOCUMENTS

WO    2004004201 A1    1/2004

* cited by examiner

*Primary Examiner* — Peter D Nolan
*Assistant Examiner* — Demetra R Smith-Stewart
(74) *Attorney, Agent, or Firm* — Arent Fox LLP; Michael Fainberg

(57) ABSTRACT

Disclosed are system and method for the identification and recognition of a motor vehicle based on the profile of the voltage values from the onboard electrical system. The system comprises a voltage and/or current detecting device connected to a vehicle's electrical system. The system is configured to create a database comprising at least one reference voltage value and/or absorbed current associated with at least one predetermined condition of the vehicle, detecting at least one value of voltage and/or current absorbed in operation associated with at least one predetermined vehicle condition and comparing the at least one reference value with the at least one operating value. In the case where at least one operating value coincides with at least one reference value, it is determined that the identifi- (Continued)

cation system is installed on the vehicle or, if not, it is determined that the identification system is not installed on the vehicle.

4 Claims, 2 Drawing Sheets

SYSTEM FOR THE IDENTIFICATION AND RECOGNITION OF A MOTOR VEHICLE BASED ON THE PROFILE OF VOLTAGE VALUES FROM THE ONBOARD ELECTRICAL SYSTEM AND CORRESPONDING IDENTIFICATION METHOD IMPLEMENTED BY SAID SYSTEM

CROSS-REFERENCE TO RELATED APPLICATIONS

This application is the U.S. National Stage Application of International Patent Application No. PCT/IB2017/053949, filed on Jun. 30, 2017, which claims priority to Italian Patent Application No. 102016000067813, filed on Jun. 30, 2016, the contents of each of which is incorporated herein by reference in its entirety.

FIELD OF THE INVENTION

The present invention relates to the automotive sector and specifically to the technical field of onboard devices of a vehicle. In particular, the invention refers to a system for the identification and recognition of a motor vehicle based on the profile of voltage values acquired from the vehicle's onboard electrical system and to a corresponding identification method implemented by said system.

PRIOR ART

Onboard devices are known, for example, for the real-time acquisition and remote transmission of motion and driving parameters of a vehicle, which not only contribute to the operation of onboard systems for driving assistance but are indispensable for the functionality of other auxiliary systems, including, for example, the vehicle's surveillance systems and dynamics recording systems, such as systems used in anti-theft devices, in monitoring devices for vehicles belonging to a fleet or in devices, known as black boxes, for detecting traffic offenses or road accidents, such as for law enforcement or insurance companies.

Typically, onboard devices for detecting data relating to motion and driving parameters of a vehicle are adapted to detect, e.g., the running speed, total driving time and engine speed of a particular vehicle under surveillance. These data are detected in view of their transmission to a remote analysis station. The data may be transferred periodically to the analysis station via an onboard communication system or simply recorded to an inviolable storage media available on board the vehicle from where the data may be retrieved later, for example, when the vehicle is subjected to a scheduled periodic maintenance intervention.

In both cases described above, the onboard device is provided to record, without distinction and continuously, every driving event and every interval of inactivity of a particular vehicle.

A disadvantage in known surveillance devices is that there is no possibility of determining the removal of the device from the vehicle to which it is associated or detecting the possible installation on a third vehicle.

This disadvantage clearly does not allow one to confirm that the monitored events actually correspond to the vehicle events to which the surveillance system should be paired.

Therefore, an ill-intentioned person who does not wish to subject his/her vehicle to monitoring could remove the onboard device coupled to the monitored vehicle and may associate it with a different vehicle.

SUMMARY OF THE INVENTION

The object of the present description is to provide a system for the identification and recognition of a motor vehicle based on the profile of the voltage values from the onboard electrical system and a corresponding identification method implemented by said system, which permits the identification of the vehicle to which said system is coupled.

According to the present invention, such object is achieved by means of a system for identifying and recognizing a motor vehicle on the basis of the profile of the voltage values from the onboard electrical system having the features recited in claim 1.

Particular embodiments are object of the dependent claims, the content of which is to be understood as an integral part of the present description.

A further object of the invention is a corresponding identification method implemented by said system, as claimed.

Further features and advantages of the invention will be described in greater detail in the following detailed description of one embodiment thereof, given by way of non-limiting example, with reference to the accompanying drawings concisely described in the subsequent paragraph.

DETAILED DESCRIPTION

Figure 1:
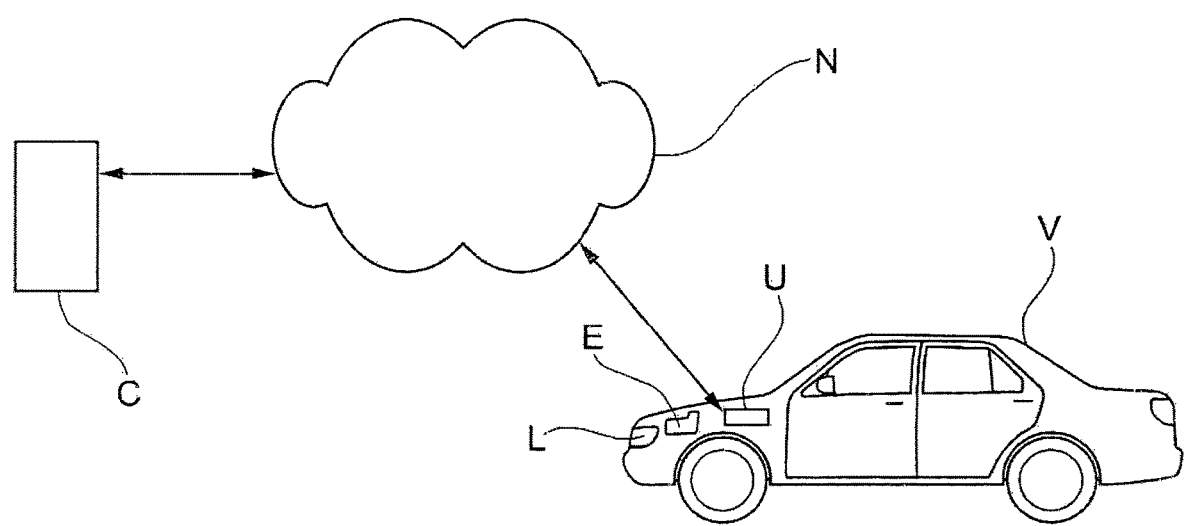
FIG. 1 is an illustrative schematic representation of the context of application of the present invention.

FIG. 1 shows illustratively the context of application of the present invention.

A generic vehicle, such as a private car or a vehicle belonging to a fleet of company vehicles, is indicated with V. The vehicle V is equipped with a thermal engine E and an electric charge accumulator assembly, known simply as a battery, indicated at B, which controls the startup of the thermal engine and/or the power supply of the vehicle's accessories, such as the lighting devices L, and is rechargeable by means of the kinetic energy of the engine, typically by means of an alternator A.

An onboard device for detecting data relating to the motion and driving parameters of the vehicle, in particular for the real-time acquisition and remote transmission of said data, is indicated with U. This device is arranged for processing data relating to motion and driving parameters of the vehicle and for transmitting said data to a central remote unit C, for example, through a public telecommunications network N.

The system for the identification and recognition of a motor vehicle based on the profile of the voltage values from the onboard electrical system is intended to recognize a vehicle based on the observation of the profiles of the voltage value and/or current absorption values of the electrical system of a motor vehicle.

The system may be associated with at least one onboard device U and comprises a voltage detection device 2 connected to the electrical system of the vehicle 4 (positive and negative) which is able to detect and record the voltage and/or current values.

This current and voltage detection serves to identify a specific vehicle model to which the identification system is connected, comparing some characteristic voltage and current elements with a predetermined database 8.

Figure 2:
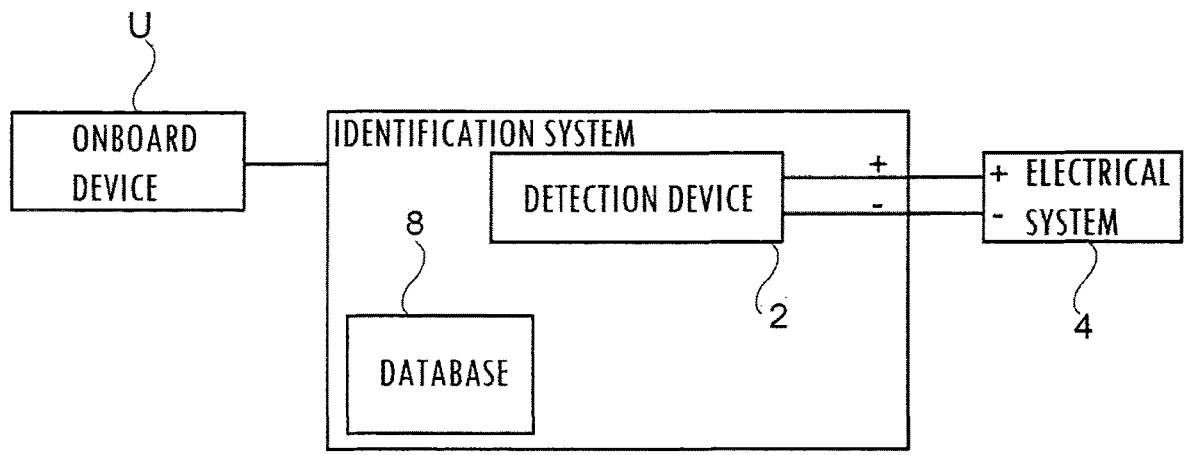
FIG. 2 shows a functional block diagram of a first embodiment of a system for identifying and recognizing a motor vehicle based on the profile of voltage values from the onboard electrical system.

FIG. 2 shows a functional block diagram of a first embodiment of a system for identifying and recognizing a motor vehicle based on the profile of voltage values from the onboard electrical system, wherein a database 8 is installed internally to the system.

Figure 3:
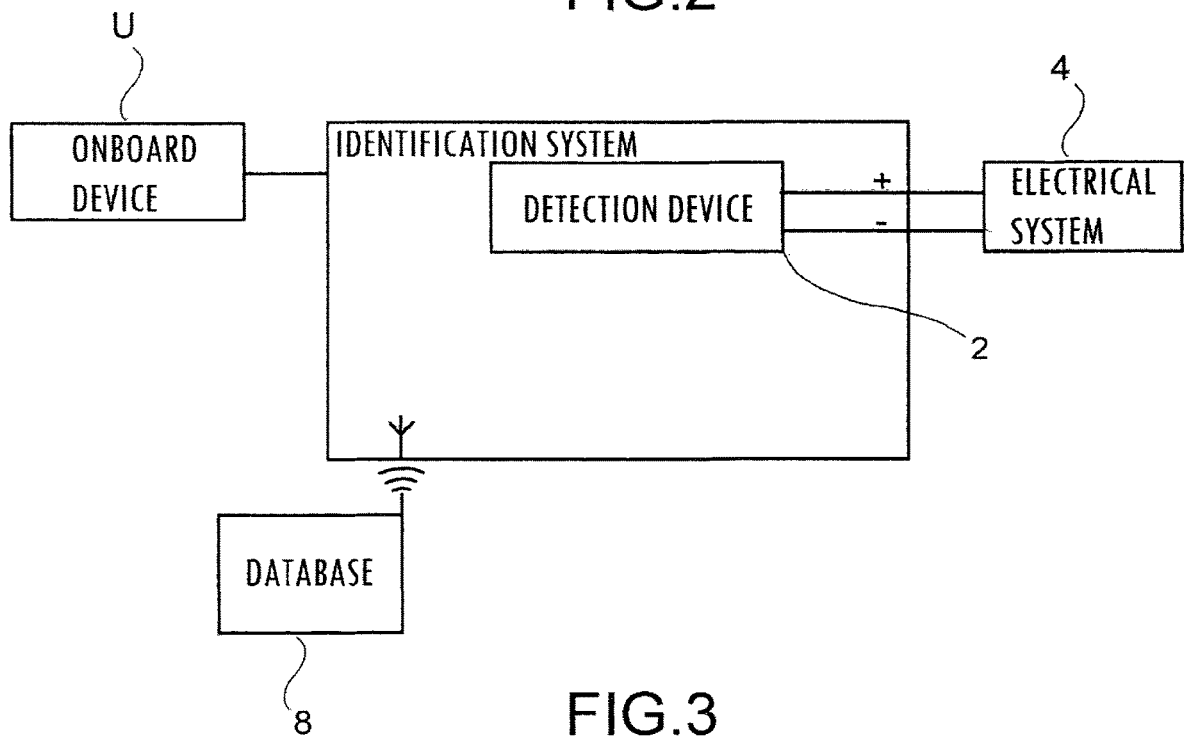
FIG. 3 shows a functional block diagram of a second embodiment of a system for identifying and recognizing a motor vehicle based on the profile of voltage values from the onboard electrical system.

FIG. 3 shows a functional block diagram of a second embodiment of a system for identifying and recognizing a motor vehicle based on the profile of voltage values from the onboard electrical system, wherein the database 8 is installed externally to the system.

The system to which an onboard device U is associated allows one to determine whether said onboard device U initially mounted on a vehicle and connected to its electrical system has been moved to a different vehicle by type or simply by engine type and/or type of vehicle accessories.

The aforementioned system for the identification and recognition of a motor vehicle may be independent or included in a more complex device U installed on board a vehicle, such as, as illustrative but not exhaustive examples, a telematic device complete with a GPS system, a radio transmission module (GSM, GPRS, UMTS, etc.) or an onboard device U for detecting data relating to the motion and driving parameters of a vehicle.

The principle of operation is similar to that of recognizing the "minutiae" of fingerprints.

In other words, the system does not aim to record and recognize the behavior of the voltage and/or current for long periods of time, but rather identifies some short but characteristic vehicle events, different for each vehicle, such as, for example: the voltage variation or current absorption during ignition of the vehicle, the voltage lowering profile after the vehicle is switched off, the activation/deactivation profile of the current generation system, the voltage lowering or current absorption caused by the lights and/or other vehicle accessories (windshield wipers, direction indicators, audio system, power steering, etc.).

Based on the identification of one or more of the profiles described above, the system is capable of uniquely identifying the vehicle.

As mentioned above, in reality, each vehicle has a different voltage profile. Even identical vehicles may have different profiles depending on the type of battery installed, the age and type of use. Clearly, the more the vehicles differ, for example with different engine types, the more pronounced the differences on the voltage profiles are.

The system, in order to identify the different features, may use additional sensors beyond those adapted to measure voltage and/or absorption values such as accelerometers, gyroscopes, geo-positioning systems, tachometers and/or data from the onboard information system (CAN line).

Information from external sensors is useful in identifying the conditions of use rather than driving conditions of the vehicle and correctly identifying the electrical characteristics of the system.

For example, due to the positioning system, the system can recognize the use condition during night-time driving to which is paired the "lights on" condition and identify the corresponding electrical profile.

The system needs a short period of learning to uniquely identify the electrical profile. After this period, the system is able to recognize the vehicle (brand, model) and/or identify the displacement of the onboard device U to which it is associated onto a different vehicle.

The detection method that may be implemented by the system for the identification of the invention comprises the steps of:
    connecting the system for the identification and recognition of a motor vehicle to a vehicle's onboard electrical system;
    creating a database 8 comprising at least one reference value of voltage and/or absorbed current, associated with at least one pre-established vehicle condition;
    detecting at least one operating value of voltage and/or absorbed current, associated with said at least one pre-established vehicle condition;
    comparing the at least one reference value with the at least one operating value, and in the case where:
    a) the at least one operating value coincides with the at least one reference value, determining that the system for the identification is installed on the vehicle;
    b) the at least one operating value does not coincide with the at least one reference value, determining that the system for the identification is not installed on the vehicle.

The step of creating a database 8 comprises in turn the steps of:
    detecting the at least one reference value of voltage and/or absorbed current, associated to the at least one pre-established vehicle condition;
    storing the at least one detected reference value of voltage and/or current absorbed.

By way of example, a vehicle condition may be an ignition stage of the vehicle, a switch-off stage of the vehicle, an activation/deactivation of the lights and/or other vehicle accessories such as windshield wipers, direction indicators, audio system, power steering, current generator, etc.

The step of detecting the at least one value of voltage and/or absorbed current comprises detecting a sequence of values of voltage and/or absorbed current over a period of time.

It is thus evident that a system for identification and a corresponding method implemented by said system, as described above, allow the predefined objects, in terms of overcoming the disadvantages of the prior art, to be fully achieved.

Naturally, without altering the principle of the invention, the embodiments and the details of implementation may vary widely with respect to that which is described and illustrated purely by way of non-limiting example, without thereby departing from the scope of protection of the invention defined by the appended claims.

The invention claimed is:

1. A system for an identification and recognition of a motor vehicle based on a profile of voltage values from an onboard electrical system, comprising:
    a voltage and/or current detecting device connected to the onboard electrical system of the motor vehicle;
    said system for the identification and recognition being configured to:
    create a database comprising at least one reference value of voltage and/or absorbed current, associated with at least one pre-established vehicle condition;

detect, using the voltage and/or current detecting device connected to the onboard electrical system, at least one operating value of voltage and/or absorbed current, associated with said at least one pre-established vehicle condition;

compare the at least one reference value in the database with the detected at least one operating value;

in the case where:
- a) the at least one operating value coincides with the at least one reference value, determining that the system for the identification and recognition is installed on the motor vehicle;
- b) the at least one operating value does not coincide with the at least one reference value, determining that the system for the identification and recognition is not installed on the motor vehicle; and when the system for the identification and recognition is installed, recognize the motor vehicle using the installed system.

2. A method for an identification and recognition of a motor vehicle based on a profile of voltage values from an onboard electrical system, comprising:

connecting a voltage and/or current detecting device to the onboard electrical system of the motor vehicle;

creating a database comprising at least one reference value of voltage and/or absorbed current, associated with at least one pre-established vehicle condition;

detecting, using the voltage and/or current detecting device connected to the onboard electrical system, at least one operating value of voltage and/or absorbed current, associated with said at least one pre-established vehicle condition;

comparing the at least one reference value in the database with the detected at least one operating value;

in the case where:
- a) the at least one operating value coincides with the at least one reference value, determining that a system for the identification and recognition is installed on the motor vehicle; and
- b) the at least one operating value does not coincide with the at least one reference value, determining that the system for the identification and recognition is not installed on the motor vehicle; and when the system for the identification and recognition is installed, recognizing the motor vehicle using the installed system.

3. The method according to claim 2, wherein the creating the database comprises:

detecting the at least one reference value of voltage and/or absorbed current, associated to the at least one pre-established vehicle condition; and storing the at least one detected reference value of voltage and/or absorbed current.

4. The method according to claim 2, wherein the detecting the at least one value of voltage and/or absorbed current, comprises:

detecting a sequence of values of voltage and/or absorbed current in a period of time.

\* \* \* \* \*